US009116907B2

(12) United States Patent
Olmino

(10) Patent No.: US 9,116,907 B2
(45) Date of Patent: Aug. 25, 2015

(54) SYSTEM AND METHOD FOR COMPRESSING PRODUCTION DATA STREAM AND FILTERING COMPRESSED DATA WITH DIFFERENT CRITERIA

(71) Applicant: SIEMENS AKTIENGESELLSCHAFT, Munich (DE)

(72) Inventor: Paolo Olmino, Genua (IT)

(73) Assignee: Siemens Aktiengesellschaft, Munich (DE)

( * ) Notice: Subject to any disclaimer, the term of this patent is extended or adjusted under 35 U.S.C. 154(b) by 190 days.

(21) Appl. No.: 13/968,612

(22) Filed: Aug. 16, 2013

(65) Prior Publication Data
US 2014/0052701 A1 Feb. 20, 2014

(30) Foreign Application Priority Data

Aug. 16, 2012 (EP) .................................. 12180689

(51) Int. Cl.
G06F 17/00 (2006.01)
G06F 7/00 (2006.01)
G06F 17/30 (2006.01)
G05B 21/02 (2006.01)
G06F 11/30 (2006.01)
G05B 19/05 (2006.01)

(52) U.S. Cl.
CPC ........ G06F 17/30153 (2013.01); *G05B 19/058* (2013.01); *G05B 21/02* (2013.01); *G05B 2219/32404* (2013.01); *G06F 11/3082* (2013.01)

(58) Field of Classification Search
CPC ..... G06F 8/34; G06F 3/0481; G06F 17/5009; G06F 11/07; G06F 11/3082; G06F 17/30153
See application file for complete search history.

(56) References Cited

U.S. PATENT DOCUMENTS

| 4,699,097 A | 10/1987 | Tanaka | |
| 4,920,489 A * | 4/1990 | Hubelbank et al. | 600/519 |
| 7,149,811 B2 * | 12/2006 | Wise et al. | 709/247 |
| 2003/0105535 A1 * | 6/2003 | Rammler | 700/17 |

(Continued)

OTHER PUBLICATIONS

Lazardis et al., "Capturing Sensor-Generated Time Series with Quality Guarantees", Computer Society, Proceedings of the 19th International Conference on Data Engineering, 2003 IEEE, pp. 429-440.

(Continued)

*Primary Examiner* — Angelica Ruiz
(74) *Attorney, Agent, or Firm* — Laurence A. Greenberg; Werner H. Stemer; Ralph E. Locher

(57) ABSTRACT

Production data are streamed by a shop floor (a field) of a plant towards a data compression processor inside a MES/ERP server. The data stream is segmented in field data intervals of variable duration, each one carrying a tag composed of initial timespan s°, final timespan e°, and the variation v° undergone by the monitored variable. The processor takes a first incoming tag and calculates a data compression interval of constant duration y which is a function of e°, then it creates a vector [s°, e°, v°, m=v°, n=e°−s°]. Until the incoming tags fall into the current compression interval, subsequent variations v° are summed up and subsequent s° and e° updated, obtaining an updated vector [s, e, v, m, n], otherwise the compression vector is stored in a SQL database and a new compression interval entered.

5 Claims, 7 Drawing Sheets

(56) References Cited

U.S. PATENT DOCUMENTS

2008/0162592 A1    7/2008    Huang et al.
2009/0271364 A1    10/2009    Hanking

OTHER PUBLICATIONS

Finnerty, J., "Automated collection of real-time production data", Sep. 30, 2008, URL: http://www.thefabricator.com/article/shopstrategies/automated-collection-of-real-time-production-data.

* cited by examiner

SYSTEM AND METHOD FOR COMPRESSING PRODUCTION DATA STREAM AND FILTERING COMPRESSED DATA WITH DIFFERENT CRITERIA

CROSS-REFERENCE TO RELATED APPLICATION

This application claims the priority, under 35 U.S.C. §119, of European application EP 12 180 689.7, filed Aug. 16, 2012; the prior application is herewith incorporated by reference in its entirety.

BACKGROUND OF THE INVENTION

Field of the Invention

The present invention concerns data logging and retrieving, and more precisely to a system and method for compressing a production data stream and filtering compressed data with different criteria.

The following article is a valid presentation of the involved matter, entitled: Data Compression for Process Historians, by Peter A. James, Copyright © 1995, Chevron Research and Technology Company, Richmond, Calif. 94802-0627.

Production data, e.g. machine statuses or production counting are information tags generated at a very high rate from the shop floor (the part of a factory housing the machines), for example there can be hundreds of records every 10 minutes, and production data need to be collected and carefully analyzed. Data collection is a very important activity within the "Enterprise Control System Integration" standardized by the ANSI/ISA/95, whose Part 1 includes a four-level hierarchical model of the plant activities. The programmable logic controllers (PLC) and the connectivity to supervisory control and data acquisition (SCADA) and distributed control system (DCS) are located at the lower levels of this model for exchanging plant floor data with the upper levels of manufacturing execution systems (MES) and business systems, e.g. enterprise resource planning (ERP).

Data collection systems are resumed in the article of James Finnerty, titled: "Automated Collection of Real-Time Production Data", Sep. 30, 2008, http://www.thefabricator.com/author/james-finnerty.

The exemplary system described in this article includes a centralized server connected to some clients. The server is housing: a data logger, a transaction manager, a scalable database, and a report generator. The client portions are made up of an e-mail client to receive reports and a web browser. The browser acts as the front end to the system and is used to view real-time data, as well as for setup and maintenance, security access, and so forth. The data logger has a program that gathers the production data and put them in the database. Distributed data loggers and centralized data loggers can be employed. The transaction manager receives production data from the data logger, parses them, performs operations on them, and stores them in the database. The database stores all of the production information and feeds the report generator and web browser front end. A structured query language (SQL) database simplifies the transfer of data to and from other software. The report generator includes a graphical interface unit (GUI), or workbench, which permits the users to create tabular and graphic reports from the information in the database. Reports typically can be configured to display data according to the date range, shift, machine, tool/part, operator. For example, a report could show production data for a number of machines which are making a number of specific parts, being run by selected operators, on a given shift. The report generator also controls report distribution. Reports typically can be sent to a printer, sent via e-mail to any chosen recipients, and posted on the network as HTML documents that can be viewed in a web browser by anyone with appropriate access. In addition, the report generator schedules when reports are distributed.

From the collected production information some important parameters to test the efficiency of the production plant are derivable. As remarked in the Finnerty's article, one of the most important metrics that can be created with collected data is a simple percentage called overall equipment effectiveness (OEE), indicating the ratio of actual equipment output to its theoretical maximum. Equipment availability, speed performance, and quality are three OEE factors based on the premise that all production losses on machines and processes can be measured and quantified. The data collection software will measure over time the production rate for every machine as it produces every part. In addition, it can track the changeover time for each machine as it changes from one part to the next. This data becomes more accurate the longer the system tracks it. Given this information, the transaction manager can accurately predict when jobs will be finished (scheduling).

Storing raw data as they come from the field gives the possibility to develop trivial procedures for accessing and filtering. It also gives the possibility to update existing data, which is not always a requirement on production data, since the mass storage consumption can soon become critical so as performance of querying data, due to an excessive time consuming. Profitably, in order to reduce level fluctuations (noise) and saving space, raw data have to be filtered and stored for successive queries. Filtering and aggregation are tasks carried out by almost all data collection systems.

The brochure titled "Hyper Historian", V. 10.6, July 2011, by ICONICS, Inc. delivered at: http://www.iconics.com/Home/Products/Historians.aspx gives a panoramic view on the topics of filtering and aggregating data from the field. Hyper Historian has a unique, automatic archiving feature that allows for the routine of triggered scheduling of data archives, freeing up disk space and backing up files for long term storage and subsequent retrieval on demand. There are a range of different filters that can be applied on the collector side to reduce the overall data storage requirements and optimize the communications between the collector and logger. The following filtering options are available on a per tag basis: Maximum, Minimum, Average, Standard Deviation, Totalizer, Running Maximum, Running Minimum, Running Average, Moving Maximum, Moving Minimum, Moving Average, and Most Recent on Time. In addition to the above filters, users can elect to log summary aggregates to a disk for a given tag. This allows the user to still capture and replay the raw data values, but to also analyze trends from a higher level using any of the below aggregate types:

| | |
|---|---|
| Interpolative | Logged interpolated values at the defined intervals |
| Average | Average value over the resampling interval |
| Time Average | Time-weighted average value over the resampling interval |
| Total | Sum of the data over the resampling interval |
| Totalize Average | Totalized value (time integral) of the data over the resampling interval |
| Minimum | Minimum value over the resampling interval |
| Maximum | Maximum value over the resampling interval |
| Minimum Actual Time | Minimum value over the resampling interval and the first timestamp of that minimum value within the resampling interval |

| | |
|---|---|
| Range | Difference between minimum and maximum values over resampling interval |
| Maximum | Maximum value over the resampling interval and the first |
| Actual Time | timestamp of that maximum value within the resampling interval |
| Annotation Count | Number of annotations made within the resampling interval |
| Count | Number of samples logged over the resampling interval |
| Start | Value at the beginning of resampling interval and timestamp of that value |
| End | Value at the end of resampling interval and timestamp of that value |
| Delta | Difference between the first and last values in the resampling interval |
| Duration Good | Duration of time in the interval during which the data is good quality |
| Duration Bad | Duration of time in the interval during which the data is bad quality |
| Percent Good | Percent of data (0-100%) within the interval with good quality |
| Percent Bad | Percent of data (0-100%) within the interval with bad quality |
| Worst Quality | Worst status code of data in the interval |

To handle filtered raw data and provide efficient logging the Hyper Historian makes use of Windows Server 2008 and a high data compression algorithm called "Swinging Door" described in the U.S. Pat. No. 4,669,097 (1987). The introductory part of this document points out a subtle distinction between filtering, averaging, and compression. Filtering eliminates some points from the presentation but the remaining are all true points. Averaging replaces true points with a false one. Compression analyzes the data stream to abstracts the critical aspects from the process and stores them in a format requiring less memory (examples are in sound and moving picture compression). Interpolation over larger resampling intervals creates a number of fictitious points lesser than the number of the original ones, so it is both a sort of averaging and compression, since the regression line passing through the points from the field abstracts the statistical trend of the process. In reality the boundaries among the various modalities of aggregations (filtering, averaging, compressing) are not so well delineated, in practice filtering, aggregation, and compression are used as synonyms. The invention described in U.S. Pat. No. 4,669,097 contains a data compression device having a data input channel, a series of logic and memory units for computing a series of segment end points corresponding to trend line representations of the data stream, and data output devices for communicating with display or memory devices. The included method reduces an input data stream to an output series of segment end points corresponding to dynamically determined trend lines representing the data stream. More particularly, the method establishes offsets from a first point which then define a corridor between an upper and lower boundary. Subsequent points are received to dynamically define by progressive refinement the final corridor direction. The boundaries are adjusted to admit successive points until a point is received that cannot be included in the dynamically defined corridor. An end point for the corridor is then generated. The two corridor end points then replace the multiplicity of intervening raw data values as the compressed data of the output signal.

Other solutions to save memory different from swinging door are now described.

The already discussed filtering of raw data coming from the field and the queering of the filtered data.

Storing raw data as it comes from the field and compressing them with a deferred off-line procedure.

Aggregation of raw data according to a selected method and querying the aggregated data.

Merging data from the non-aggregated domain with that from the aggregated domain (or merging data with different granularities) and retrieving the required information.

The swinging door is a real-time compression algorithm which has indubitable advantages, being based on the comparison of couples of slopes (the slopes of the two line called the doors) between the starting and successive points, a constant sampling interval is absolutely needed. This constitutes an unacceptable constraint for most modern shop floor data collectors, since tags from the field are generally issued at not constant rate during the monitoring time. Another drawback is that the error which sets the maximum opening of the doors is decided arbitrarily as an initial condition, and this entails a variable compression rate. To achieve a fixed compression rate the error has to be changed dynamically, this is expressly foreseen on condition that the storage runtime available and the time until storage will be renewed are both known. Extra processing is continuously required for reallocating the remaining memory over the remaining time.

As far as points i) to iv) are concerned:

The procedure at this point is characterized by being excessive time consuming.

The procedure at this point solves the problem of performances, but introduces more system overhead and greater delay in data access, as the load phase is time consuming. Also, it does not solve the issue about the mass storage usage, which must contain two copies of the data. The requirement of data updates can be addressed, but only by complex and time consuming compression procedures.

The approach at this point can make compression quicker, but queries that were possible on non-aggregated data are impossible after aggregation.

The approach at this point proves awkward and not well integrated with the progress of technology, where more homogeneous solutions are preferred. The mixed approach makes use of difficult implementation that can hardly be ported to advanced development environment (for instance, different queries on two databases that are required to overcome security issues or Microsoft SSAS fact tables that must be merged by use of scope constructs).

BRIEF SUMMARY OF THE INVENTION

It is accordingly an object of the invention to provide a system and a method for compressing a production data stream and filtering compressed data with different criteria that overcome the above-mentioned disadvantages of the prior art devices and methods of this general type, which are able to compress data tags coming irregularly from a production line (the field). A further purpose of the invention is that of providing different criteria for further aggregating the compressed data, so that the intrinsic incompatibility between compression and querying on the aggregated data can be attenuated.

The invention achieves the object by providing a system for compressing data stream coming from the shop floor of a plant, also termed the field, the data stream being segmented in field data intervals, each one carrying a tag composed of at least a value v° associated to a monitored variable and the timestamp when the variable was recorded or calculated. The system includes:

a first buffering device for temporarily storing the tags coming from the field;

a programmable processing device including firmware configured for having access to the first buffering device and taking subsequent values v° and accumulating them within compression time intervals as summation data values v, also termed compressed values v;
a database accessible by the processing device for storing compressed values v taken from a second buffering device;
a post-processing device for querying the database;
wherein in accordance with the invention the firmware being further configured for:
calculating the end w of a current compression interval by the following function:

$$w(e°)=z+\text{ceiling}[(e°-z)/y]\times y;$$

in which: z indicates the start of the compression process, y is a predetermined constant indicating the duration of each compression interval, e° is a timestamp indicating the end of a current field data interval entering the current compression interval at first and further including a timestamp s° indicating the start;
calculating the duration n=e°−s° of the data interval entering the current compression interval at first; and
comparing every subsequent timestamp e° with the value w and updating s°, e° until e°≤w is detected, as soon as this condition is false storing in the database a vector [s, e, v, v°, n] wherein s, e, v, are updated s°, e° and accumulated v°, and entering a new compression interval, the metric v°/n constituting a multiplier usable, whenever requested, for linearly interpolating the value v° across at least one of the two ends of one or more filtering intervals to be prefigured for postponed aggregation of the entering compressed values v.

It is also an objective of the invention to provide a method for compressing a data stream coming from the shop floor of a plant, also termed the field. The data stream is segmented in field data intervals, each one carrying a tag composed of at least a value v° associated to a monitored variable and the timestamp when the variable was recorded or calculated. The method including the steps of:
a) receiving tags sent from the field;
b) accumulating subsequent values v° during a compression time interval in order to obtain summation data values v, also termed compressed values v;
c) storing the compressed values v in a database and repeating the steps a) to c) while the compression process is on-going;
wherein in accordance with the invention of method step b) further includes the steps of:
calculating the end w of a current compression interval by the following function:

$$w(e°)=z+\text{ceiling}[(e°-z)/y]\times y;$$

in which: z indicates the start of the compression process, y is a predetermined constant indicating the duration of each compression interval, e° is a timestamp indicating the end of a current field data interval entering the current compression interval at first and further including a timestamp s° indicating the start;
calculating the duration n=e°−s° of the data interval entering the current compression interval at first; and
comparing every subsequent timestamp e° with the value w and updating s°, e° until e°≤w is detected, as soon as this condition is false storing in the database during step c) a vector [s, e, v, v°, n] wherein s, e, v, are updated s°, e° and accumulated v°, and entering a new compression interval, the metric v°/n constituting a multiplier usable, whenever requested, for linearly interpolating the value v° across at least one of the two ends of one or more filtering intervals to be prefigured for postponed aggregation of the entering compressed values v, as disclosed in a relevant independent claim of method.

According to one aspect of the invention, the aggregation into filtering intervals avails of selectable filtering criteria depending on the positioning of the duration n in respect of the boundaries of the filtering interval.

According to another aspect of the invention:
lower end a and upper end b of the filtering interval are calculated in such a way that (a−z)/y and (b−z)/y are integers, and
whenever the selected filtered criterion requires it, the interpolation of the value v° at the lower end a is performed by multiplying v° by the ratio between (a−s°) and (e°−s°), while interpolation at the upper end b is performed by multiplying v° by the ratio between (b−s°) and (e°−s°).

According to another aspect of the invention, for a selected filtering criterion and for each compression interval the further aggregation is performed by accumulating respective linear combinations of contributions, each belonging to a subset of time slices overlapping to the compression interval, either totally or partially, and having associated a boundary condition of that filtering criterion.

The present invention gives the possibility to aggregate raw production data as soon as they come from the field over irregular intervals of different durations.

Differently from known modalities for aggregating measures, the invention further take a new metric n/m=v°/(e°−s°), which corresponds to the average production speed of the first interval from the field entering the compression interval. The new metric permits interpolations of real-time measures across the boundaries of the time-constant aggregation intervals, so as interpolation across the boundaries of postponed aggregation intervals of arbitrary length according to different selectable filtering criteria. Linear interpolation at the two ends entails more precise evaluations of the aggregations and enables the user to calculate a contribution possible statistically although undetermined physically.

The present invention used for accessing compressed values allows the user to retrieve aggregate values equal to what they could retrieve on original field data in less time.

Lastly, real-time compression and storage compared to simple storage, against an increased number of floating point operations, has the benefit of saving storage and reducing in this way the overhead proportionally to the compression ratio, since mathematical operations are easily handled by all modern processors.

Other features which are considered as characteristic for the invention are set forth in the appended claims.

Although the invention is illustrated and described herein as embodied in a system and a method for compressing production data stream and filtering compressed data with different criteria, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
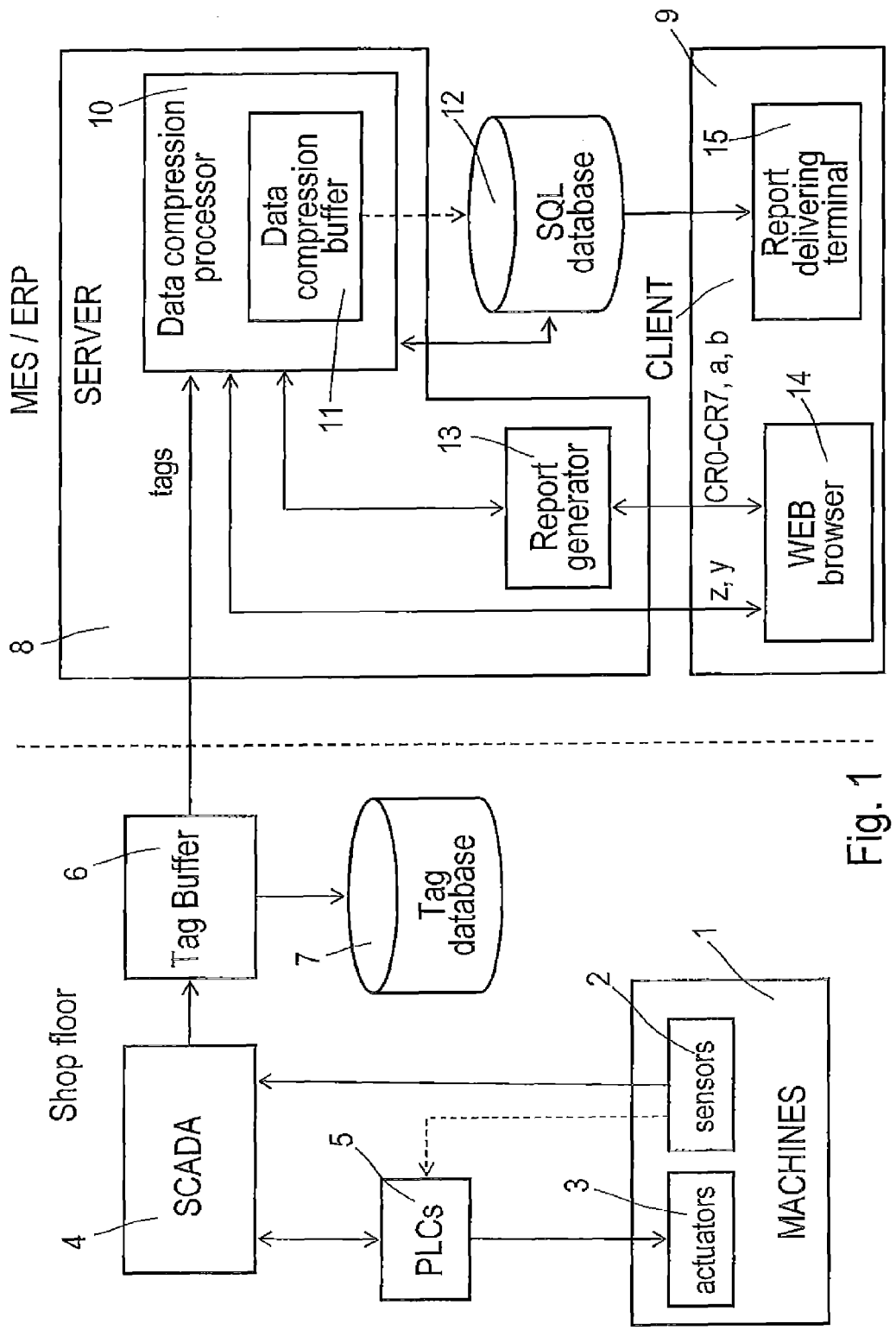
FIG. 1 is an illustration of a typical MES/ERP scenario wherein a shop floor is connected to a data compression processor which executes a program for compressing raw data from a field according to the invention.

In the context of information technology (IT), FIG. 1 schematizes the shop floor of a plant and its MES/ERP control plane operating in agreement with the ANSI/ISA 95 standard. Proprietary data compression solutions are admitted by this standard. With reference to FIG. 1, block 1 (MACHINES) represents the whole production components, to say equipment and single devices used at the shop floor for manufacturing the products. Block 1 includes sensors 2 and actuators 3 activated inside the equipment. Typical production components are: photocells, manometers, thermometers, motors, step-drives, conveyors, valves, pumps, and the like. The various sensors 2 generate a flux of data towards a supervisory control and data acquisition (SCADA) functional block 4, which host control functions in a feedback control loop usually restricted to basic overriding or supervisory level intervention. A pool of programmable logic controllers (PLC) 5 are enabled by the SCADA 4 to exert local control. The PLCs 5 may also gather sensing data and use them for operating the actuators 3 directly or alternatively send them to the SCADA 4. The SCADA 4 collects information elements called tags and stores them temporarily in a tag buffer 6, before being stored in a tag database 7 for a longer refresh time. A tag is associated to a point which represents a single input or output value monitored or controlled by the system. Tags are normally stored as value-timestamp pairs: a value, and the timestamp when it was recorded or calculated. A series of value-timestamp pairs gives the history of that point. Usually the intervals acquired from the field are adjacent one to the previous, so that their duration or extent is not fixed but the end of an interval is equal to the start of the following. But production process works continuatively limitedly to an unpredictable time span, since in many circumstances faults or other causes of interruption may happen. Possible interruptions shall be considered and the monitoring activity adapted consequently. An alternative is that of collecting at each subsequent acquisition interval a tag including the initial timestamp, the end timestamp, and the associated variation of the monitored variable. This alternative, against a little increased throughput, is capable to allot the true value of the monitored variable to its true production data interval.

The space of the database 7 would tend to grow up indefinitely due to the mass of continuously stored raw data, and soon storage and queering would become problematic, unless a compressed representation of the contained data is maintained before the periodical refresh. Still referencing to FIG. 1, a Server/Client architecture is configured at MES/ERP plane for executing the desired data compression and storing process. A server 8 includes a data compression processor 10, which in its turn includes (not shown) arithmetic and logic unit (ALU), RAM/ROM, registers, I/O ports, bus drivers, interrupt controllers, etc. The data compression processor 10 also includes a memory containing firmware for executing the data compression algorithm illustrated in FIG. 4. The server 8 further includes a data compression buffer 11 for temporarily storing tag information elaborated in a compressed form by the data compression processor 10. At the server side 8 a relational database management system (RDBMS) is also implemented for managing an SQL database 12, which permanently stores the compressed information coming from the data compression buffer 11. Yet in the server 8 a report generator 13 is interfaced with a WEB browser 14 installed in a personal computer 9 located at the client side. The SQL database 12 is interfaced with the data compression processor 10 for being updated and queried, and with a report delivering terminal 15 present at the client side 9, preferably one capable to run an e-mail protocol.

In operation, the WEB browser 14 acts as a front end to the server 8, it is used to initialize the compression process and issuing the queries directed to the SQL database 12 through the report generator 13 and the data compression processor 10, as well as for setup and maintenance, security access, and so forth. More precisely, the WEB browser 14 initializes the compression process by sending two numbers z, y to the data compression processor 10; two other numbers a, b, and a code $cr_n$ may be sent if a further aggregation (filtering) of compressed values is requested. The data compression processor 10 is involved with continuously checking the tag buffer 6 for catching new tags and immediately submitted them to the compression algorithm detailed in FIG. 4. For the aim of the present invention the report generator 13 reports to the WEB browser 14 information concerning compressed values and filtered compressed values. The report generator 13 also controls the reports sent via e-mail to the delivering terminal 15, and/or to the WEB browser 14 to be posted on the network as HTML documents that can be viewed by anyone with appropriate access. The successive FIGS. 2 to 8 are dedicated to explain in detail the compression algorithm.

Figure 2:
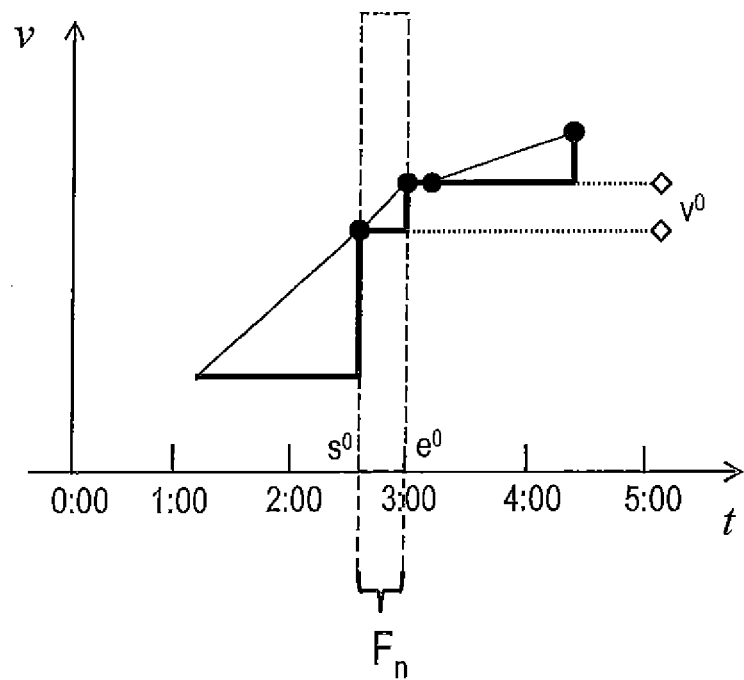
FIG. 2 is a graph of a data sample (tag) from the field.

FIG. 2 represents over two orthogonal axes: time, values v (indicated with solid dots), the model of a field data interval $F_n$ carrying a tag. The model can be interpreted as a vector of the form $[s°, e°, v°]$ containing the following information: initial timespan s°, final timespan e°, and a variation v° undergone by the monitored variable between the reading at e° and the reading at s°. The suffix ° is only a graphical expedient for indicating timestamps and values acquired directly from the field, so as to distinguish them from homonym values related to the compression intervals. Example: a device on a production plant transmits to a certain point, a message of the type "by 2:49 PM to 2:53 PM 150 packets of coffee are passed on the conveyer". Those measurements of time and quantity are the timestamps s°, e° and the value v° acquired from field.

Without limitation for the invention, the intervals $F_n$ acquired from the field are adjacent one to the previous and their extents is not necessarily constant, usually but not as a rule the end of an interval is equal to the start of the following one and in similar case the only copy e°, v° could be sent from the field.

Figure 3:
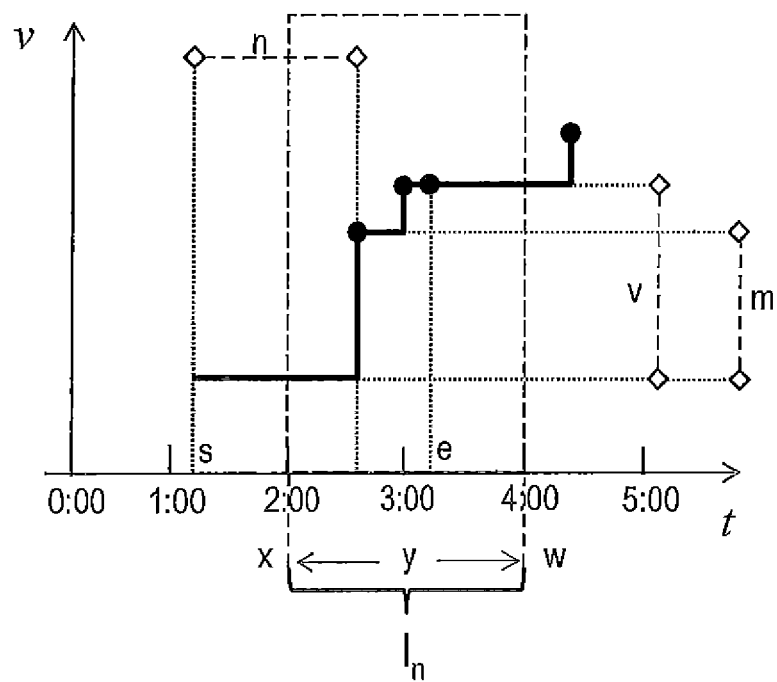
FIG. 3 is a graph of a current compression interval extent.

FIG. 3 is a model over two orthogonal axes: time, values v, of a compression interval $I_n$ according to the present invention. The compression interval $I_n$ has a constant duration y spanning several field data intervals $F_n$ between timestamps s-e. The duration y spans typically some minutes (e.g. 10 minutes): the greater y the greater the compression rate. A start time z has a base time coordinate (such as 2000/01/01-00:00:00). The duration y and the first start z are defined a priori.

Every compression interval gathers field intervals [s, e] ending in the range [x, w], where w−x=y (e.g. if y=2 minutes and z=00:00:00, possible values for x and w are 00:02:00 and 00:04:00. The value w is a function of the timestamp e°. A tag that terminates at the instant e° will fall in the compression interval terminating in w(e°), calculated as in the following:

$$w(e°)=z+\text{ceiling}((e°-z)/y) \times y, \quad (1)$$

where the function ceiling(.) returns the next integer value equal or following a real number.

Extending the previous example: a device of a production system transmits a message of the type "from 2:49 PM to 2:53 PM 150 packets of coffee are passed on the conveyer belt". Shortly after it transmits "from 2:53 PM to 2:56 PM 10 packets of coffee are passed on the conveyer belt". Finally "from 2:56 PM to 2:59 PM 5 packets of coffee are passed on the conveyer belt".

Let's say you want to compress these data in five minute intervals (y) from 14:00 (z). In the case of the various intervals from the field (asterisk means the product):

$$w(14:53)=14:00+\text{ceiling}((14:53-14:00)/5)*5=14:00+$$
$$\text{ceiling}(53/5)*5=14:00+\text{ceiling}(10.6)*5=14:00+$$
$$11*5=14:55;$$

$$w(14:56)=14:00+\text{ceiling}((14:56-14:00)/5)*5=14:00+$$
$$\text{ceiling}(56/5)*5=14:00+\text{ceiling}(11.2)*5=14:00+$$
$$12*5=15:00;$$

$$w(14:59)=14:00+\text{ceiling}((14:59-14:00)/5)*5=14:00+$$
$$\text{ceiling}(59/5)*5=14:00+\text{ceiling}(11.8)*5=14:00+$$
$$12*5=15:00.$$

The first interval will be compressed by only, while the second and third will give life to a single compression interval.

The model of compression interval of FIG. 3 also includes two auxiliary figures n and m arbitrarily called the entering duration n and the entering variation m described in the figure, the metric m/n constituting a multiplier that will be used for linearly interpolating the first value v° entering a new compression interval across either one or both ends of a predetermined and postponed aggregation interval (filtering interval).

Figure 4:
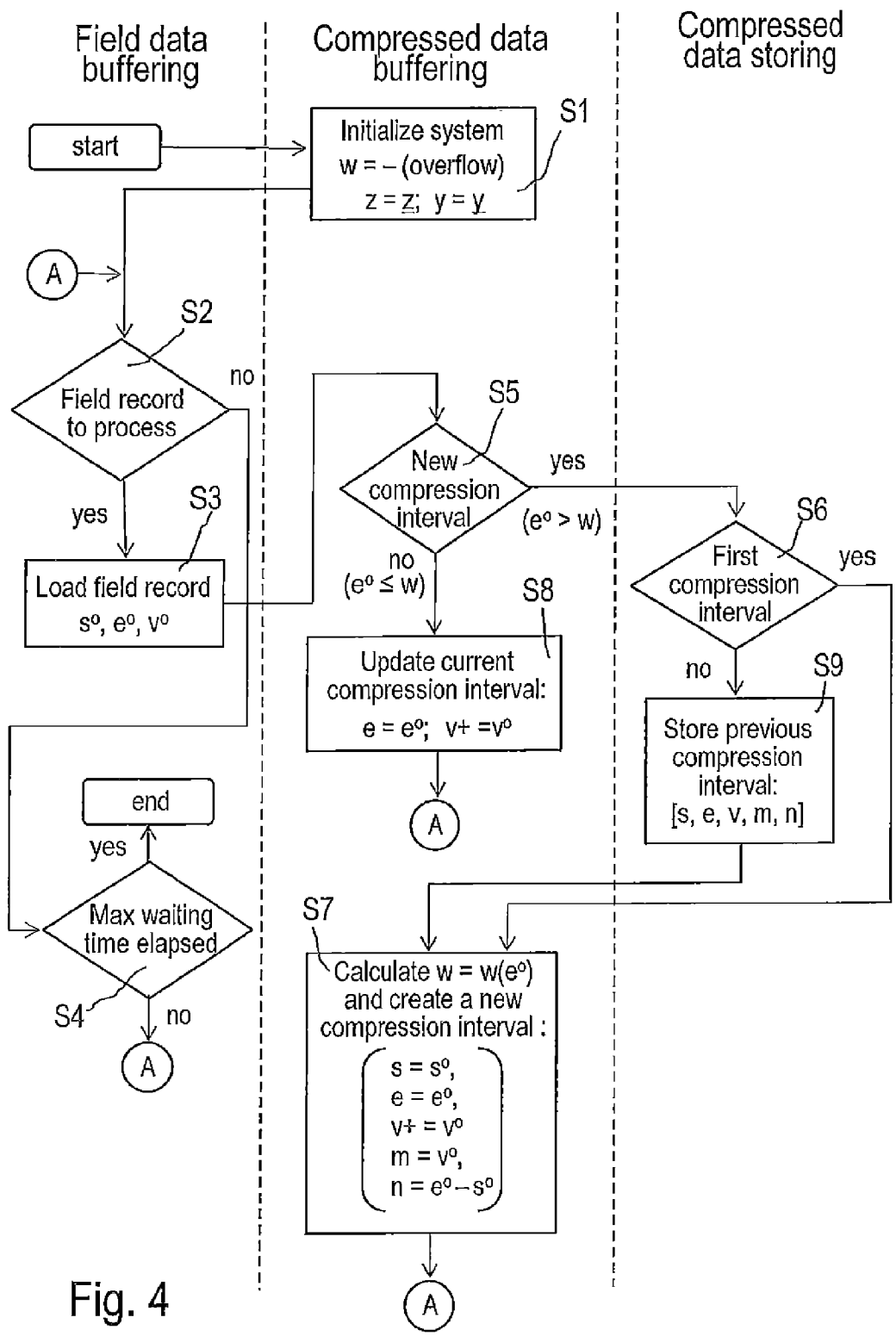
FIG. 4 is flow chart of the data compression method executed by the server of FIG. 1.

FIG. 4 is a flow chart of a computer program stored into the data compression processor 10 (FIG. 1) which runs it for executing a real-time data compression. The steps specified by the flow chart are associated to three headers: Field data buffering, compressed data buffering, and compressed data storing. With reference to both FIGS. 4 and 1, a first initializations step S1 is entered at the start instant of the program for: clearing all memory registers; writing respective predetermined values z and y in the registers of z and y; writing its maximum permitted negative value in the register of variable w; clearing the buffer 6 of incoming tags; clearing the data compression buffer 11. During the successive step S2 the program is waiting for receiving a tag from the field. For the aim of graphical simplification the entering in S2 is marked with a circled A. If in S2 a tag arrives from the field, the vector [s°, e°, v°] is stored in the buffer 6 during step S3, otherwise the maximum permitted waiting time is checked in step S4 for stopping the program if this watch dog time is lapsed, or returning the control to the wait step S2. The vector received in step S2 is differently processed on the basis of a boundary condition checked in step S5. If in step S5 the condition e°>w is true a step S6 is entered to check if the current tag belongs to the first in absolute compression interval. If this condition is also satisfied a step S7 is entered for calculating the expression (1) and then creating a new compression interval (x, w) characterized by a vector [s, e, v, m, n] created in the following manner: s=s°, e=e°, v+=v°, m=v°, n=e°-s°: the item v+=v° indicates summation (accumulation) of subsequent values v° in the buffer 11, then the program returns to the point A. Otherwise if in S6 the answer is no a step S9 is entered to permanently store the vector [s, e, v, m, n] pertaining to the previous compression interval in the SQL database 12, and after that the program returns to the point A.

At every return to point A if max waiting time is not elapsed steps S2, S3, S5 are cyclically repeated to test the boundary condition e°≤w in step S5. Until this condition is true the current value v° is accumulated in the buffer 11, and the current timestamp e° replaces the previous one stored in a relevant register called e. As soon as the tested condition e°≤w is false a new compression interval is entered and the previous one is stored as indicated in step S9, which is certainly executed since the current compression interval is not the first absolute in step S6. The program of FIG. 4 works continuously for producing sequential compression intervals $I_n$, as the ones shown in FIG. 5, and calculating relevant compression vectors [s, e, v, m, n] to be stored in the SQL database 12.

The following is a description in pseudo-code of the flow chart of FIG. 4.

```
const z = z, y = y          (e.g. z = 0; y = 2)
field = Field( )
db = PersistencyEngine( )
w = −overflow
while (field.hasData( )):
    [s°, e°, v°] = field.getData( )
    if (e° > w):
        if (w > −overflow):
            db.store([s, e, v, m, n])
        w = z + ceiling ((e°− z)/y) × y
        [s, e, v, m, n] = [s°, e°, v°, e° − s°]
    else:
        e = e°
        v+= v°
db.store([s, e, v, m, n]).
```

Figure 5:
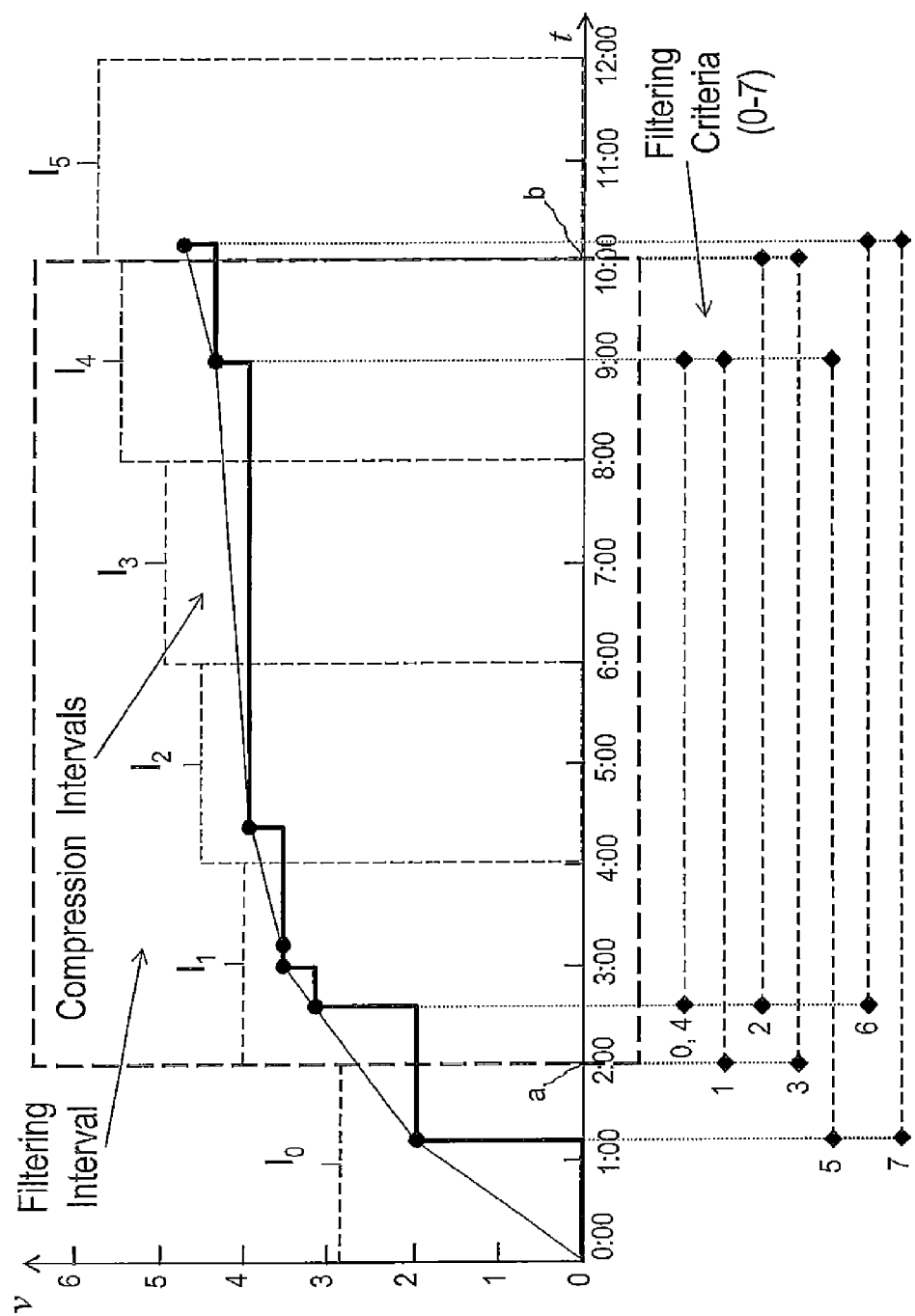
FIG. 5 is a graph of adjacent compressed intervals $I_n$ further aggregated, according to differently selectable filtering criteria, into respective filtering ranges overlapping a filtering interval (a-b), totally or partially.

In FIG. 5, six adjacent compression intervals $I_0$ to $I_5$ are superimposed to a time-value representation of data from the field. Each interval $I_0$ to $I_5$ is lasting two minutes and the first $I_0$ starts at the origin of time. The ensemble of compression intervals extend over 8-minutes interval a-b starting at minute 2 and ending at minute 10. The compression intervals $\{I_0, I_1, I_2, I_3, I_4, I_5\}$ in their vectorial form [s, e, v, m, n] are:

$I_0$=[0.0, 1.2, 2.0, 2.0, 1.2],
$I_1$=[1.2, 2.6, 1.6, 1.2, 0.6],
$I_2$=[3.2, 4.4, 0.4, 0.4, 0.4],
$I_3$=[4.4, 9.0, 0.0, 0.0, 2.0],
$I_4$=[4.4, 9.0, 0.4, 0.4, 1.0],
$I_5$=[9.0, 10.2, 0.4, 0.4, 0.2].

These vectors are stored in the SQL database 12 to provide a history of the monitored tag. The compression intervals are mainly designed for demonstrating the construction rules, since the small difference between their number and the number of field intervals spanning the same interval a-b entails a small compression rate.

Now, with reference to FIG. 5, a postponed modality of aggregation called "filtering" is described. Given a range [a, b], where a and b are such that (a−z)/y and (b−z)/y are integers, different aggregation criteria, indicated by cr, are defined on field data, as specified in the following Table 1 (numeric indices, which relate to different occurrences, are all in subscript or indicated between square brackets).

TABLE 1

| cr | Matching Intervals | Aggregate policy | Internal Denomination |
|---|---|---|---|
| 0 | $a < s°[i] \leq e°[i] \leq b$ | Interpolated variation of samples contained in [a, b] | Inside timespan |
| 1 | $a \leq e°[i] \leq b$ | Interpolated variation of samples ending in [a, b] | Upper bounds |
| 2 | $a \leq e°[i] \leq b$ | Interpolated variation of samples starting in [a, b] | Lower bounds |
| 3 | $a < e°[i] \wedge s°[i] \leq b$ | Interpolated variation of samples overlapping with [a, b] | Linear interpolation |
| 4 | $a < s°[i] \leq e°[i] \leq b$ | Variation of samples contained in [a, b] | Inside timespan |
| 5 | $a \leq e°[i] \leq b$ | Variation of samples ending in [a, b] | Inside timespan and Upper bounds |
| 6 | $a \leq s°[i] \leq b$ | Variation of samples starting in [a, b] | Inside timespan and Lower bounds |
| 7 | $a < e°[i] \wedge s°[i] \leq b$ | Variation of samples overlapping with [a, b] | Inside timespan and Bounds |

The header "Aggregate Policy" makes distinction between interpolation and variation. The values v° [i] from the field carried by the two intervals [s° [i], e° [i]] partially superimposed to the filtering interval a-b, undergone linear interpolation to obtain respective intermediate values v[a] and v[b]. The interpolated values are:

$$v[a]=(v°[i]/(e°[i]-s°[i]))\times(a-s°[i]), \quad (2)$$

$$v[b]=(v°[i]/(e°[i]-s°[i]))\times(b-s°[i]), \quad (3)$$

The interpolated values v[a] and v[b] represent the production average speed multiplied by the overlapping duration of the field interval with the filtering range in a and in b, respectively.

In the bottom part of FIG. 5 the eight selectable filtering criteria of Table 1 (cr=0-7) are shown in relation with the interval a-b. It must be noted that criteria cr=0 and cr=4 are equivalent because they fall entirely inside a-b, so that there is not interpolation.

It also must be noted that the total aggregation at the end of the filtering interval a-b may be calculated either accumulating values $v_i$ acquired directly from the field, or accumulating compressed values $V_i$ associated to constant-width compression intervals (e.g. $I_0$-$I_5$) calculated as described in FIG. 4 and stored in vectorial form in the database 12. The second method is the only one relevant to the present invention.

In the first case using the notations:
$V_i$(filtering_interval_start, filtering_interval_end, criterion)=relevant variation on the field interval i over a filtering interval starting at filtering_interval_start and ending at filtering_interval_end, according to the given criterion, and
V(filtering_interval_start, filtering_interval_end, criterion)=total variation on the field intervals over a filtering interval starting at filtering_interval_start and ending at filtering_interval_end according to the given criterion,
the total variation, namely the compression, is:

$$V(a,b,cr)=\Sigma_{i\in U}V_i(a,b,cr) \quad (4)$$

$$U=\{i|F_i\langle \text{overlaps}\rangle[a,b]\} \quad (5)$$

In the second case using the notations:
$C_j$(filtering_interval_start, filtering_interval_end, criterion)=relevant variation on the compression interval j over a filtering interval starting at filtering_interval_start and ending at filtering_interval_end, according to the given criterion, and
C(filtering_interval_start, filtering_interval_end, criterion)=total variation on the compression intervals over a filtering interval starting at filtering_interval_start and ending at filtering_interval_end according to the given criterion,
the total variation, namely the compression, is:

$$C(a,b,cr)=\Sigma_{j\in J}C_j(a,b,cr) \quad (6)$$

$$J=\{j|Y_j\langle \text{overlaps}\rangle[a,b]\} \quad (7)$$

In accordance with the invention, the compression intervals $Y_j$ shall not escape the rule introduced by the expression (1).

Figure 6:
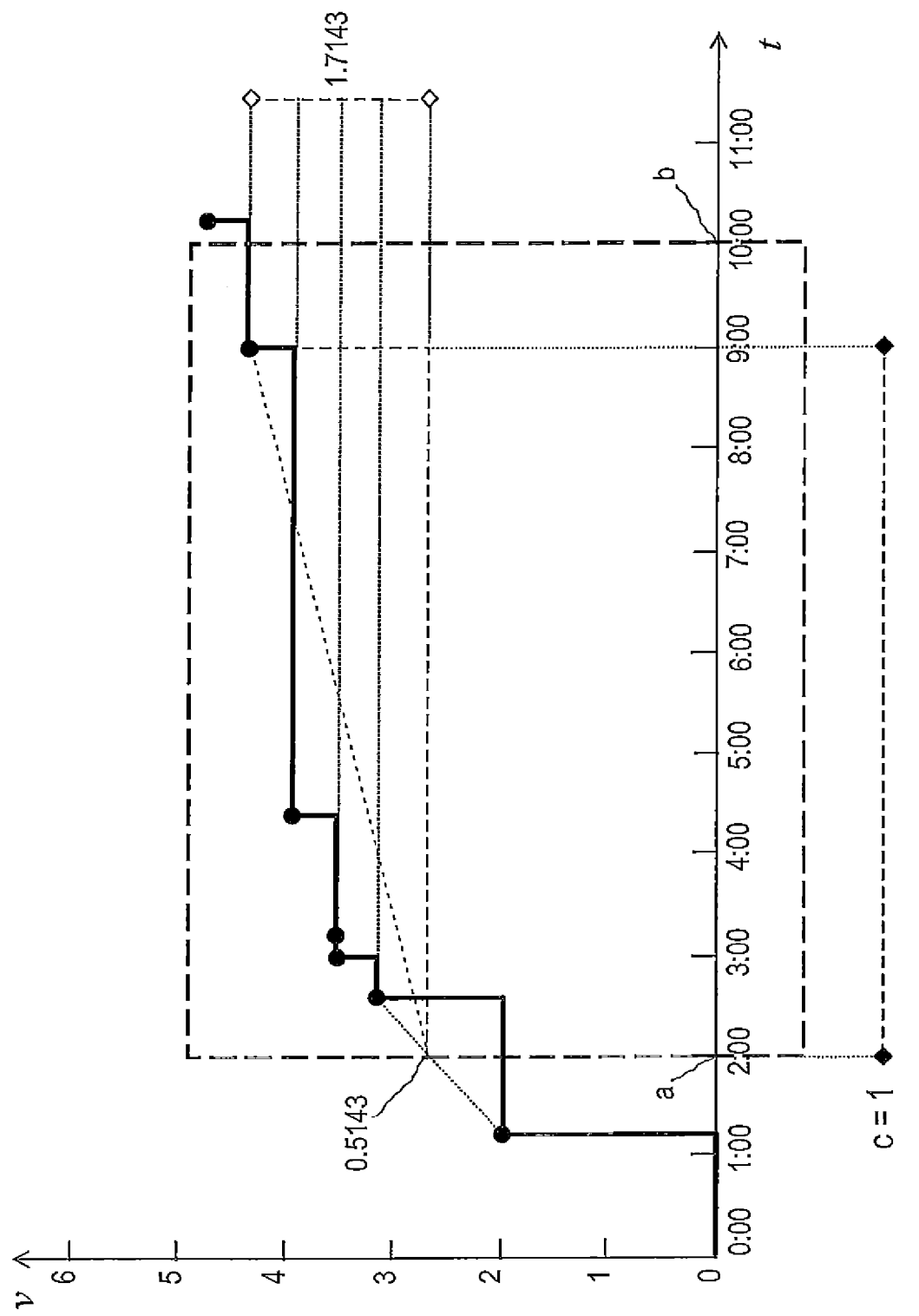
FIG. 6 is a graph of an "upper bounds" filtering criterion directly operating on raw data from the field over a filtering range (a-b) of FIG. 5.

FIG. 6 shows the result of aggregating field data under the "upper bounds" criterion (cr=1). This is done by linearly interpolating the first variation $v_o$ across its first interval from the field, and aggregating the interpolated value with the successive field data $v_i$ according to the expressions (4) and (5). The calculation must return the total variation in the field intervals ending in the given range [2, 10]. The procedure is a demonstrative "short cut" to achieve the same total variation calculated by aggregating the compression intervals ($I_0$-$I_n$ or $Y_0$-$Y_n$) in accordance with the invention.

Field Intervals:
$\{F_0, F_1, F_2, F_3, F_4, F_5\}\equiv\{[0.0, 1.2, 2.0], [1.2, 2.6, 1.2], [2.6, 3.0, 0.4], [3.2, 4.4, 0.4], [4.4, 9.0, 0.4], [9.2, 10.2, 0.4]\}$.

Relevant interval variations:

$V_0(2, 10, 1) = 0$ since the interval $F_0$ ends before the inferior limit $a$.

$$V_1(2, 10, 1) = (e_1° - a)\times(v_1°/(e_1°s_1°))$$
$$= 0.6 \times (1.2/1.4)$$
$$= 0.5143 \ldots \text{ partial interval}$$
$$F_1 \text{ interpolated over } [a, e_1°].$$

$V_2(2, 10, 1) = 0.4$ whole interval $F_2$.

$V_3(2, 10, 1) = 0.4$ whole interval $F_3$.

$V_4(2, 10, 1) = 0.4$ whole interval $F_4$.

$V_5(2, 10, 1) =$ 0 the interval $F_5$ ends after the upper limit $b$.

Thus:

$$V(2, 10, 1) = V_0(2, 10, 1) + V_1(2, 10, 1) + V_2 2, 10, 1)$$
$$+ V_3(2, 10, 1) + V_4(2, 10, 1) + V_5(2, 10, 1)$$
sum of relevant variations
$$= 0 + 0.5143 \ldots + 0.4 + 0.4 + 0.4 + 0 =$$
$$1.7143 \ldots$$

Figure 7:
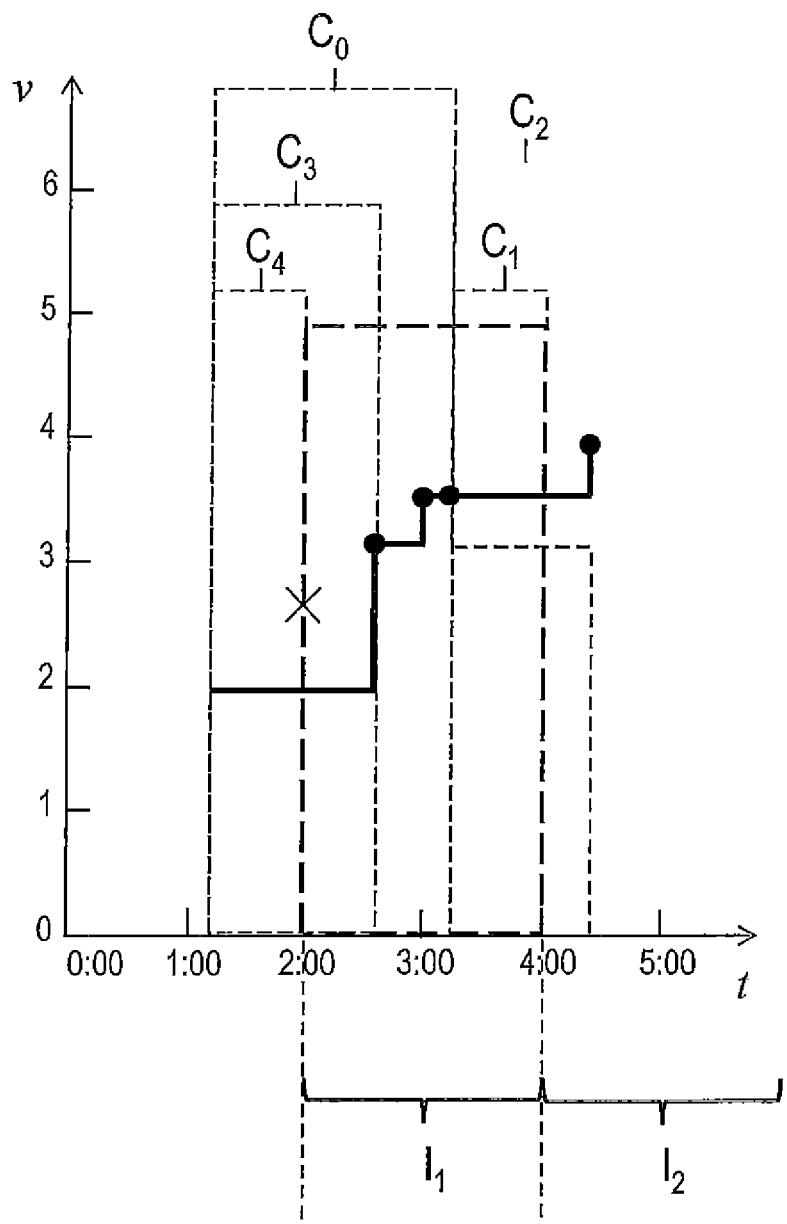
FIG. 7 is a graph of an exemplary compression interval decomposed into different time slices.

With reference to FIG. 7, each compression interval $I_n$ can be broken into smaller parts $c_n$, here called contributions. The following five contributions are assumed:
$c_0$. Non-final field data intervals.
$c_1$. Left (internal) fringe of the final field data interval.
$c_2$. Final field data interval.
$c_3$. Initial field data interval.
$c_4$. Left (external) fringe of the initial field interval.

Contributions $c_n$ can be expressed in terms of filtering ends a, b and of the vector [s, e, v, m, n] of the originating compression interval as in the Table 2 below:

TABLE 2

| Contribution | Condition | Value of Contribution |
|---|---|---|
| $c_0$ | $e \leq b$ | v |
| $c_1$ | $e > b$ | $(m/n) \times (b - s)$ |
| $c_2$ | $e > b$ | m |
| $c_3$ | $s < a$ | m |
| $c_4$ | $s < a$ | $(m/n) \times (a - s)$ |

The different filtering criteria cr of Table 1 can be expressed in terms of contributions $c_n$ of Table 2, as described in the following TABLE 3.

TABLE 3

| cr | Combination of contributions | Internal Denomination |
|---|---|---|
| 0 | $c_0 - c_3$ | (Inside timespan) |
| 1 | $c_0 - c_4$ | Upper bounds |
| 2 | $c_0 + c_1 - c_3$ | Lower bounds |
| 3 | $c_0 + c_1 - c_4$ | Linear interpolation |
| 4 | $c_0 - c_3$ | Inside timespan |
| 5 | $c_0$ | Inside timespan and Upper bounds |
| 6 | $c_0 + c_2 - c_3$ | Inside timespan and Lower bounds |
| 7 | $c_0 + c_2$ | Inside timespan and Bounds |

The filtering criteria according to expressions (6) and (7) must be calculated based on a decomposition of compression intervals $C_j(a,b,cr)$.

Starting from Table 1 and also considering Table 2 and 3, a summation function can be defined to reproduce the filtering criteria cr on compression intervals. Considering that:

$$V(a,b,cr) = \text{summation } F_i \text{ in } [a,b] =$$

$$= C(a,b,cr) = \text{summation } Y_j \text{ in } [a,b], \quad (8)$$

by applying the summation function to all compression intervals $Y_j$ that overlap with the filtering interval [a, b], the original filtered variation V on field data in [a, b] can be obtained from their compressed form C. Before proceeding as said, the following Boolean function shall be defined:

$$\text{sign(condition)} \equiv 1 \text{ whenever the condition is true,}$$

$$\text{otherwise } 0, \quad (9)$$

"conditions" are the ones given in Table 2. The function (9) is defined from the Boolean domain to the numeric co-domain.

We have:
$C_j(a,b,0) \equiv c_0 - c_3 \equiv \text{sign}(e \leq b) \times v - \text{sign}(s<a) \times m$.
$C_j(a,b,1) \equiv c_0 - c_4 \equiv \text{sign}(e \leq b) \times v - \text{sign}(s<a) \times (m/n) \times (a-s)$.
$C_j(a,b,2) \equiv c_0 - c_3 \equiv \text{sign}(e \leq b) \times v + \text{sign}(e<b) \times (m/n) \times (b-s) - \text{sign}(s<a) \times m$.
$C_j(a,b,3) \equiv c_0 + c_1 - c_4 \equiv \text{sign}(e \leq b) \times v + \text{sign}(e<b) \times (m/n) \times (b-s) - \text{sign}(s<a) \times (m/n) \times (a-s)$.
$C_j(a,b,4) \equiv c_0 - c_3 \equiv \text{sign}(e \leq b) \times v - \text{sign}(s<a) \times m$.
$C_j(a,b,5) \equiv c_0 \equiv \text{sign}(e \leq b) \times v$.
$C_j(a,b,6) \equiv c_0 + c_2 - c_3 \equiv \text{sign}(e \leq b) \times v - \text{sign}(s<a) \times m$.
$C_j(a,b,7) \equiv c_0 + c_2 \equiv \text{sign}(e \leq b) \times v - \text{sign}(s<a) \times m$.

Description in Pseudo-Code:

```
Override def Filter(bounds as Interval, criterion as FilteringCriteria) as
Interval:
c as (ValueInterval) = (
    (End ≤ bounds.End) × Interval(Start, End, Variation),
    (End > bounds.End) × Interval(Start, bounds.End,
        EntranceSpeed( ) × (bounds.End – Start)),
    (End > bounds.End) × Interval(Start, bounds.End,
        Entrance Variation),
    Start < bounds.Start) × Interval(Start, bounds.Start,
        Entrance Variation),
    Start < bounds.Start) × Interval(Start, bounds.Start,
        EntranceSpeed( )× (bounds.Start – Start))
)
if not (self & bounds):
    return null
if criterion == FilteringCriteria.NoBounds://contained in
    return c[0] – c[3]
if criterion == FilteringCriteria.UpperBounds://ends in
    return c[0] – c[4]
if criterion == FilteringCriteria.LowerBounds://starts in
    return c[0] + c[1] – c[3]
if criterion == FilteringCriteria.LinearInterpolation: //overlaps
    return c[0] + c[1] – c[4]
if criterion == FilteringCriteria.InsideTimespan://contained in
    return c[0] – c[3]
if criterion == FilteringCriteria.InsideTimespan
AndUpperBounds: //ends in
    return c[0]
if criterion == FilteringCriteria.InsideTimespan
AndLowerBounds://starts in
    return c[0] + c[2] – c[3]
if criterion == FilteringCriteria.InsideTimespanAndBounds: //overlaps
    return c[0] + c[2]
return null.
```

Figure 8:
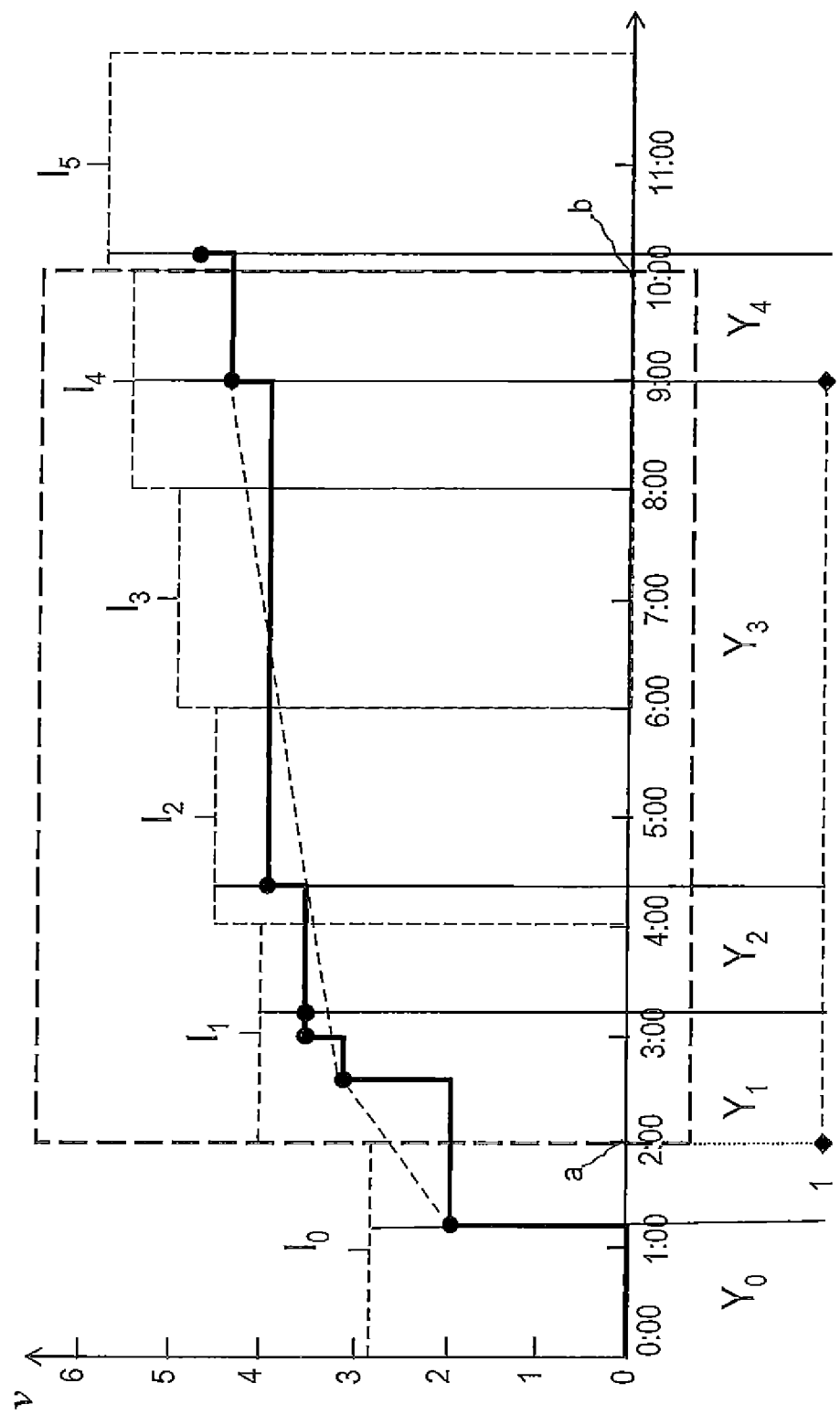
FIG. 8 is a graph of the "upper bounds" filtering criterion operating on compression intervals over its aggregation range of FIG. 5.

FIG. 8 shows how filtering compressed values using the "upper bounds" criterion cr=1. The calculation must return the so called "interpolated variation" in the intervals ending in the given range (2, 10]. The compression intervals $Y_j$ is given in the form $[s_j, e_j, v_j, n_j, m_j]$. Because of the expression (8) the compression exerted in these intervals can be obtained in the field data domain $\{F_0, F_1, F_2, F_3, F_4, F_5\}$ (as a demonstrative short cut) or in the domain of the compression intervals $\{I_0, I_1, I_2, I_3, I_4, I_5\}$, according to the invention. Field intervals $F_1, F_2, F_3$ merge into $Y_1$ depending on their ending time coordinates falling in the interval [2, 4].

The numerical values are the following:
$\{F_0, F_1, F_2, F_3, F_4, F_5\} \equiv [s_j, e_j, v_j] = \{[0.0, 1.2, 2.0], [1.2, 2.6, 1.2], [2.6, 3.0, 0.4], [3.2, 4.4, 0.4], [4.4, 9.0, 0.4], [9.0, 10.2, 0.4]\}$.

$\{Y_0, Y_1, Y_2, Y_3, Y_4\} \equiv [s_j, e_j, v_j, n_j, m_j] \equiv \{[0.0, 1.2, 2.0, 2.0, 1.2], [1.2, 3.2, 1.6, 1.2, 1.4], [3.2, 4.4, 0.4, 0.4, 1.2], [4.4, 9.0, 0.4, 0.4, 4.6], [9.0, 10.2, 0.4, 0.4, 1.2]\}$.

Relevant interval variations:

$C_0(2, 10, 1) = 0$ the interval $Y_0$ ends before a.

$C_1(2, 10, 1) = c_{0,1} - c_{4,1}$ contributions of $Y_1$.
$= \text{sign } (e_0 \leq b) \times v_0 - \text{sign } (s_0 < a) \times (m_0/n_0) \times (a - s_0)$
$= \text{sign } (3.2 \leq 10) \times 1.6 - \text{sign } (1.2 < 2.0) \times$
$\quad (1.2/1.4) \times (2.0 - 1.2)$
$= 1 \times 1.6 - 1 \times (0.8571 \ldots) \times (0.8)$
$= 1.6 - 0.6857 \ldots$
$= 0.9143 \ldots$ $C_2(2, 10, 1) = c_{0,2} - c_{4,2}$ contributions of $Y_2$
$= \text{sign } (4.4 \leq 10) \times 0.4 - \text{sign } (3.2 < 2.0) \times$
$\quad (0.4/1.2) \times (2.0 - 3.2)$
$= 0.4$ -continued $$C_3(2, 10, 1) = c_{0,3} - c_{4,3} \text{ contributions of } Y_3$$
$$= \text{sign } (9.2 \le 10) \times 0.4 - \text{sign } (4.4 < 2.0) \times$$
$$(0.4/4.6) \times (2.0 - 4.4)$$
$$= 1 \times 0.4 - 0 \times (0.087 \ldots) \times (-2.4)$$
$$= (0.4)$$

$$C_4(2, 10, 1) = c_{0,4} - c_{4,4} \text{ contributions of } Y_4$$
$$= \text{sign } (10.2 \le 10) \times 0.4 - \text{sign } (9.0 < 2.0) \times$$
$$(0.4/1.2) \times (2.0 - 9.0)$$
$$= 0 \times 0.4 - 0 \times (0.3333 \ldots) \times (-7.0)$$
$$= 0$$

Thus:

$$C(2, 10, 1) = C_0(2, 10, 1) + C_1(2, 10, 1) + C_2(2, 10, 1) +$$
$$C_3(2, 10, 1) + C_4(2, 10, 1) \text{ sum of relevant variations}$$
$$= 0 + 0.9143 \ldots + 0.4 + 0.4 + 0$$
$$= 1.7143 \ldots$$

The total variation matches the calculation on field data.

The detailed description of filtering with "upper bounds" criterion is sufficient to the skilled man to filter according to the other criteria.

Although the invention has been described with particular reference to a preferred embodiment, it will be evident to those skilled in the art, which the present invention is not limited thereto, but further variations and modifications may be applied without departing from the scope of the invention as defined by the annexed claims.

The invention claimed is:

1. A system for compressing a data stream coming from a shop floor defined as a field of a plant, the data stream being segmented in field data intervals, each of the field data intervals carrying a tag composed of at least a value $v°$ associated to a monitored variable and a timestamp when the monitored variable was recorded or calculated, the system comprising:
    a first buffering device for temporarily storing tags coming from the field;
    a programmable processing device containing firmware configured for having access to said first buffering device and taking the subsequent values $v°$ and accumulating the values within compression time intervals as summation data values v being compressed values v;
    a second buffering device;
    a database accessible by said programmable processing device for storing the compressed values v taken from said second buffering device;
    a post-processing device for querying said database;
    said firmware of said programmable processing device programmed to:
        calculate an end value w of a current compression interval by means of the following function:

$w(e°) = z + \text{ceiling}[(e°-z)/y] \times y$ in which: z indicates a start of a compression process, y is a predetermined constant indicating a duration of each compression interval, $e°$ is a timestamp indicating an end of a current field data interval entering a current compression interval at first and further including a timestamp $s°$ indicating the start;
        calculate a duration $n = e° - s°$ of a data interval entering the current compression interval at first; and
        compare every subsequent timestamp $e°$ with the end value w and updating $s°, e°$ until $e° \le w$ is detected, as soon as the condition is false storing in said database a vector [s, e, v, $v°$, n] wherein s, e, v, are updated $s°$, $e°$ and accumulated $v°$, and entering a new compression interval, a metric $v°/n$ constituting a multiplier usable, whenever requested, for linearly interpolating the value $v°$ across at least one of two ends of at least one filtering interval to be prefigured for postponed aggregation of entering compressed values v.

2. A method for compressing a data stream coming from a shop floor defined as a field of a plant, the data stream being segmented in field data intervals, each of the field data intervals carrying a tag composed of at least a value $v°$ associated to a monitored variable and a timestamp when the monitored variable was recorded or calculated, which comprises the steps of:
    a) receiving tags sent from the field;
    b) accumulating subsequent values $v°$ during a compression time interval to obtain summation data values defined as compressed values v, the step b) further including the sub steps of:
        b1) calculating an end value w of a current compression interval by means of the following function:

$w(e°) = z + \text{ceiling}[(e°-z)/y] \times y;$ in which: z indicates a start of a compression process, y is a predetermined constant indicating a duration of each compression interval, $e°$ is a timestamp indicating an end of a field data interval entering a current compression interval at first and further including a timestamp $s°$ indicating the start;
        b2) calculating a duration $n = e° - s°$ of a data interval entering the current compression interval at first;
        b3) comparing every subsequent timestamp $e°$ with the end value w and updating $s°, e°$ until $e° \le w$ is detected, as soon as condition is false storing in the database during step c) a vector [s, e, v, $v°$, n] wherein s, e, v, are updated $s°$, $e°$ and accumulated $v°$, and entering a new compression interval, a metric $v°/n$ constituting a multiplier usable, whenever requested, for linearly interpolating the value $v°$ across at least one of two ends of at least one filtering interval to be prefigured for postponed aggregation of entering compressed values v; and
    c) storing the compressed values v in a database and repeating the steps a) to c) while a compression process is on-going.

3. The method according to claim 2, wherein an aggregation into filtering intervals avails of selectable filtering criteria depending on a positioning of a duration n in respect of boundaries of the filtering interval.

4. The method according to claim 3, which further comprises:
    calculating a lower end a and an upper end b of the filtering interval such that $(a-z)/y$ and $(b-z)/y$ are integers;
    whenever selected filtered criterion requires it, an interpolation of the value $v°$ at the lower end a is performed by multiplying $v°$ by a ratio between $(a-s°)$ and $(e°-s°)$, while the interpolation at the upper end b is performed by multiplying $v°$ by a ratio between $(b-s°)$ and $(e°-s°)$.

5. The method according to claim 4, wherein for the selected filtering criterion and for each compression interval a further aggregation is performed by accumulating respective linear combinations of contributions, each belonging to a subset of time slices overlapping to the compression interval, either totally or partially, and having associated a boundary condition of the filtering criterion.

* * * * *